(12) United States Patent
Choi et al.

(10) Patent No.: US 9,125,216 B1
(45) Date of Patent: Sep. 1, 2015

(54) METHOD AND APPARATUS FOR AVOIDING INTERFERENCE AMONG MULTIPLE RADIOS

(71) Applicants: Jihwan P. Choi, Santa Clara, CA (US); Ying Cai, Santa Clara, CA (US); Hui-Ling Lou, Sunnyvale, CA (US); Manyuan Shen, Milpitas, CA (US)

(72) Inventors: Jihwan P. Choi, Santa Clara, CA (US); Ying Cai, Santa Clara, CA (US); Hui-Ling Lou, Sunnyvale, CA (US); Manyuan Shen, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 213 days.

(21) Appl. No.: 13/622,916

(22) Filed: Sep. 19, 2012

Related U.S. Application Data

(60) Provisional application No. 61/540,162, filed on Sep. 28, 2011.

(51) Int. Cl.
*H04B 7/01* (2006.01)
*H04W 72/08* (2009.01)
*H04W 16/14* (2009.01)

(52) U.S. Cl.
CPC ............ *H04W 72/082* (2013.01); *H04W 16/14* (2013.01)

(58) Field of Classification Search
CPC ..... H04W 16/14; H04W 16/00; H04W 16/16; H04W 18/16; H04W 18/24; H04W 36/00; H04W 36/005; H04W 36/10; H04W 36/24; H04W 40/00; H04W 40/02; H04W 40/24; H04W 40/34; H04W 68/00; H04W 68/005

USPC ........ 455/501, 63, 67.3, 41.2, 509, 67.11, 78, 455/73, 41.3, 553.1, 166.1, 88, 550.1, 455/522.1, 436, 437, 442; 370/329, 328, 370/331, 338, 334
See application file for complete search history.

(56) References Cited

U.S. PATENT DOCUMENTS

| | | | |
|---|---|---|---|
| 4,337,463 A | 6/1982 | Vangen | |
| 4,366,350 A | 12/1982 | Lee et al. | |
| 4,385,384 A | 5/1983 | Rosbury et al. | |
| 4,805,215 A | 2/1989 | Miller | |
| 5,347,234 A | 9/1994 | Gersbach et al. | |
| 5,634,207 A | 5/1997 | Yamaji et al. | |
| 5,673,291 A | 9/1997 | Dent | |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"Final Office Action", U.S. Appl. No. 12/883,054, Jun. 9, 2014, 22 pages.

(Continued)

*Primary Examiner* — Tan Trinh

(57) ABSTRACT

The present disclosure describes techniques for avoiding interference among multiple radios. In some aspects a communication channel of a first wireless interface of a device is determined to be adjacent to a frequency band in which a second wireless interface of the device is configured to communicate and channel measurement results are altered prior to transmission by the first wireless interface to a base station, effective to prevent the base station from selecting, for use by the first wireless interface, the channel adjacent to the frequency band of the second wireless interface.

20 Claims, 7 Drawing Sheets

(56) References Cited

U.S. PATENT DOCUMENTS

| | | | |
|---|---|---|---|
| 5,708,656 A | 1/1998 | Noneman et al. | |
| 5,847,616 A | 12/1998 | Ng et al. | |
| 5,995,819 A | 11/1999 | Yamaji et al. | |
| 6,035,210 A * | 3/2000 | Endo et al. | 455/522 |
| 6,167,245 A | 12/2000 | Welland et al. | |
| 6,285,262 B1 | 9/2001 | Kuriyama | |
| 6,320,919 B1 | 11/2001 | Khayrallah et al. | |
| 6,347,091 B1 | 2/2002 | Wallentin et al. | |
| 6,366,622 B1 | 4/2002 | Brown et al. | |
| 6,374,117 B1 | 4/2002 | Denkert et al. | |
| 6,438,364 B1 | 8/2002 | Waite | |
| 6,452,458 B1 | 9/2002 | Tanimoto | |
| 6,509,777 B2 | 1/2003 | Razavi et al. | |
| 6,519,461 B1 | 2/2003 | Andersson et al. | |
| 6,535,037 B2 | 3/2003 | Maligeorgos | |
| 6,553,229 B1 | 4/2003 | Dent | |
| 6,640,308 B1 | 10/2003 | Keyghobad et al. | |
| 6,650,195 B1 | 11/2003 | Brunn et al. | |
| 6,675,328 B1 | 1/2004 | Krishnamachari et al. | |
| 6,738,358 B2 | 5/2004 | Bist et al. | |
| 6,741,846 B1 | 5/2004 | Welland et al. | |
| 6,741,862 B2 | 5/2004 | Chung et al. | |
| 6,754,189 B1 | 6/2004 | Cloutier et al. | |
| 6,760,671 B1 | 7/2004 | Batcher et al. | |
| 6,816,452 B1 | 11/2004 | Maehata | |
| 6,816,718 B2 | 11/2004 | Yan et al. | |
| 6,922,433 B2 | 7/2005 | Tamura | |
| 6,934,566 B2 | 8/2005 | Kang et al. | |
| 6,946,950 B1 | 9/2005 | Ueno et al. | |
| 6,954,708 B2 | 10/2005 | Rakshani et al. | |
| 7,079,811 B2 | 7/2006 | Lee et al. | |
| 7,092,428 B2 | 8/2006 | Chen et al. | |
| 7,139,540 B2 | 11/2006 | Wu et al. | |
| 7,173,431 B1 | 2/2007 | Lo et al. | |
| 7,174,488 B1 | 2/2007 | Chu | |
| 7,206,840 B2 | 4/2007 | Choi et al. | |
| 7,212,798 B1 | 5/2007 | Adams et al. | |
| 7,239,882 B1 | 7/2007 | Cook | |
| 7,257,095 B2 | 8/2007 | Liu | |
| 7,286,009 B2 | 10/2007 | Andersen et al. | |
| 7,298,183 B2 | 11/2007 | Mirzaei et al. | |
| 7,310,023 B2 | 12/2007 | Cha et al. | |
| 7,319,849 B2 | 1/2008 | Womac | |
| 7,342,895 B2 | 3/2008 | Serpa et al. | |
| 7,355,416 B1 | 4/2008 | Darshan | |
| 7,377,441 B2 | 5/2008 | Wiklof et al. | |
| 7,395,040 B2 | 7/2008 | Behzad | |
| 7,403,018 B1 | 7/2008 | Lo et al. | |
| 7,463,592 B2 | 12/2008 | Poncini et al. | |
| 7,529,548 B2 | 5/2009 | Sebastian | |
| 7,551,948 B2 | 6/2009 | Meier et al. | |
| 7,564,826 B2 | 7/2009 | Sherman et al. | |
| 7,580,397 B2 | 8/2009 | Arai et al. | |
| 7,595,768 B2 | 9/2009 | Li et al. | |
| 7,599,671 B2 | 10/2009 | Kopikare et al. | |
| 7,616,935 B2 | 11/2009 | Fernandez-Corbaton et al. | |
| 7,626,966 B1 | 12/2009 | Ruiter et al. | |
| 7,627,025 B2 | 12/2009 | Wang et al. | |
| 7,627,026 B2 | 12/2009 | Wang et al. | |
| 7,636,388 B2 | 12/2009 | Wang et al. | |
| 7,656,205 B2 | 2/2010 | Chen et al. | |
| 7,659,003 B2 | 2/2010 | Aoki et al. | |
| 7,664,085 B2 | 2/2010 | Waxman | |
| 7,672,645 B2 | 3/2010 | Kilpatrick et al. | |
| 7,689,190 B2 | 3/2010 | Kerth et al. | |
| 7,711,004 B2 | 5/2010 | Xu | |
| 7,717,342 B2 | 5/2010 | Wang | |
| 7,725,118 B2 | 5/2010 | Yang et al. | |
| 7,734,253 B2 | 6/2010 | Chen et al. | |
| 7,777,624 B2 | 8/2010 | Wu et al. | |
| 7,826,411 B2 | 11/2010 | Gonikberg et al. | |
| 7,844,222 B2 | 11/2010 | Grushkevich | |
| 7,849,333 B2 | 12/2010 | Schindler | |
| 7,876,786 B2 | 1/2011 | Bahl et al. | |
| 7,881,746 B2 | 2/2011 | Desai | |
| 7,881,755 B1 | 2/2011 | Mishra et al. | |
| 7,898,948 B2 | 3/2011 | DiGirolamo et al. | |
| 7,936,714 B1 | 5/2011 | Karr et al. | |
| 7,957,340 B2 | 6/2011 | Choi et al. | |
| 7,966,036 B2 | 6/2011 | Kojima | |
| 7,983,216 B2 | 7/2011 | Iyer et al. | |
| 7,995,544 B2 | 8/2011 | Benveniste | |
| 8,000,715 B2 | 8/2011 | Melpignano et al. | |
| 8,014,329 B2 | 9/2011 | Gong | |
| 8,045,922 B2 | 10/2011 | Sherman et al. | |
| 8,046,024 B2 | 10/2011 | Sudak et al. | |
| 8,060,017 B2 | 11/2011 | Schlicht et al. | |
| 8,072,913 B2 | 12/2011 | Desai | |
| 8,073,388 B2 | 12/2011 | Grushkevich et al. | |
| 8,077,652 B2 | 12/2011 | Thesling | |
| 8,078,111 B2 | 12/2011 | Jovicic et al. | |
| 8,081,038 B2 | 12/2011 | Lee et al. | |
| 8,085,737 B2 | 12/2011 | Zhu | |
| 8,107,391 B2 | 1/2012 | Wu et al. | |
| 8,121,144 B2 | 2/2012 | Bitran | |
| 8,126,502 B2 | 2/2012 | Trainin | |
| 8,139,670 B1 | 3/2012 | Son et al. | |
| 8,140,075 B2 * | 3/2012 | Watanabe | 455/436 |
| 8,149,715 B1 | 4/2012 | Goel | |
| 8,150,328 B2 | 4/2012 | Chaudhri et al. | |
| 8,159,928 B2 | 4/2012 | Gorokhov et al. | |
| 8,165,102 B1 | 4/2012 | Vleugels et al. | |
| 8,170,002 B2 | 5/2012 | Wentink | |
| 8,170,546 B2 | 5/2012 | Bennett | |
| 8,187,662 B2 | 5/2012 | Blinn et al. | |
| 8,189,506 B2 | 5/2012 | Kneckt et al. | |
| 8,189,526 B2 | 5/2012 | Hsu et al. | |
| 8,203,985 B2 | 6/2012 | Gong et al. | |
| 8,204,015 B2 | 6/2012 | Chaudhri et al. | |
| 8,219,142 B2 | 7/2012 | Khairmode et al. | |
| 8,229,087 B2 | 7/2012 | Sumioka et al. | |
| 8,254,296 B1 | 8/2012 | Lambert | |
| 8,256,681 B2 | 9/2012 | Wang | |
| 8,274,894 B2 | 9/2012 | Kneckt et al. | |
| 8,275,314 B1 | 9/2012 | Lin | |
| 8,310,967 B1 | 11/2012 | Goel | |
| 8,315,564 B2 | 11/2012 | Banerjea | |
| 8,340,034 B1 | 12/2012 | Lee | |
| 8,364,188 B2 | 1/2013 | Srinivasan et al. | |
| 8,369,782 B1 | 2/2013 | Lin et al. | |
| 8,442,434 B2 | 5/2013 | Grushkevich et al. | |
| 8,451,776 B2 | 5/2013 | Dayal et al. | |
| 8,472,427 B2 | 6/2013 | Wheeler et al. | |
| 8,472,968 B1 | 6/2013 | Kim | |
| 8,483,190 B2 | 7/2013 | Donovan | |
| 8,493,966 B2 | 7/2013 | Bendelac | |
| 8,493,992 B2 | 7/2013 | Sella et al. | |
| 8,496,181 B2 | 7/2013 | Wang | |
| 8,526,348 B2 | 9/2013 | Desai | |
| 8,532,041 B1 | 9/2013 | Lambert et al. | |
| 8,537,798 B2 | 9/2013 | Tsfati et al. | |
| 8,537,799 B2 | 9/2013 | Tsfati et al. | |
| 8,553,561 B1 | 10/2013 | Chokshi et al. | |
| 8,571,479 B2 | 10/2013 | Banerjea | |
| 8,577,305 B1 | 11/2013 | Rossi et al. | |
| 8,588,705 B1 | 11/2013 | Tsui et al. | |
| 8,599,814 B1 | 12/2013 | Vleugels et al. | |
| 8,600,324 B1 | 12/2013 | Cousinard et al. | |
| 8,619,732 B2 | 12/2013 | Khairmode et al. | |
| 8,626,067 B2 * | 1/2014 | Ko et al. | 455/41.2 |
| 8,649,734 B1 | 2/2014 | Lin et al. | |
| 8,654,773 B2 | 2/2014 | Wentink et al. | |
| 8,655,278 B2 | 2/2014 | Laroche et al. | |
| 8,655,279 B2 | 2/2014 | Banerjea | |
| 8,665,848 B2 | 3/2014 | Wentink | |
| 8,730,927 B2 | 5/2014 | Thoukydides | |
| 8,737,370 B2 | 5/2014 | Wentink | |
| 8,750,278 B1 | 6/2014 | Wagholikar et al. | |
| 8,750,926 B2 | 6/2014 | Fu et al. | |
| 8,767,616 B2 | 7/2014 | Choi et al. | |
| 8,767,771 B1 | 7/2014 | Shukla et al. | |
| 8,805,303 B2 | 8/2014 | Koo et al. | |
| 8,817,662 B2 | 8/2014 | Mahaffy et al. | |
| 8,817,682 B1 | 8/2014 | Goel et al. | |

(56) References Cited

U.S. PATENT DOCUMENTS

| | | |
|---|---|---|
| 8,842,618 B2 | 9/2014 | Yu et al. |
| 8,861,469 B1 | 10/2014 | Lee et al. |
| 8,891,497 B1 | 11/2014 | Vleugels |
| 8,897,706 B1 | 11/2014 | Lin et al. |
| 8,913,599 B2 | 12/2014 | Gonikberg et al. |
| 8,923,788 B1 | 12/2014 | Cousinard et al. |
| 8,983,557 B1 | 3/2015 | Sun et al. |
| 8,989,669 B2 | 3/2015 | Banerjea |
| 9,026,162 B2 | 5/2015 | Wagholikar et al. |
| 9,036,517 B2 | 5/2015 | Bijwe |
| 9,055,460 B1 | 6/2015 | Kim |
| 9,066,369 B1 | 6/2015 | Nemavat et al. |
| 9,078,108 B1 | 7/2015 | Wagholikar et al. |
| 2002/0025810 A1 | 2/2002 | Takayama et al. |
| 2002/0049854 A1 | 4/2002 | Cox et al. |
| 2002/0102941 A1* | 8/2002 | Kuiri et al. ............... 455/63 |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2003/0214430 A1 | 11/2003 | Husted et al. |
| 2004/0013128 A1 | 1/2004 | Moreton |
| 2004/0044489 A1 | 3/2004 | Jones et al. |
| 2004/0063403 A1 | 4/2004 | Durrant |
| 2004/0105401 A1 | 6/2004 | Lee |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |
| 2004/0264396 A1 | 12/2004 | Ginzburg et al. |
| 2004/0264397 A1 | 12/2004 | Benveniste |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0195786 A1 | 9/2005 | Shpak |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1* | 2/2007 | Love et al. ............... 455/67.11 |
| 2007/0032211 A1 | 2/2007 | Kopikare et al. |
| 2007/0060057 A1 | 3/2007 | Matsuo et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0100494 A1 | 5/2008 | Yamaura |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1* | 3/2009 | Fischer ............... 370/338 |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0240998 A1 | 9/2009 | Nikkila et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0258603 A1 | 10/2009 | Ghaboosi et al. |
| 2009/0268652 A1 | 10/2009 | Kneckt et al. |
| 2009/0275299 A1 | 11/2009 | Buch et al. |

(56) References Cited

U.S. PATENT DOCUMENTS

| | | |
|---|---|---|
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0124213 A1 | 5/2010 | Ise et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1* | 11/2010 | Beser ............ 709/238 |
| 2010/0303026 A1 | 12/2010 | Chaudhri et al. |
| 2010/0311342 A1 | 12/2010 | Arbel |
| 2010/0316027 A1 | 12/2010 | Rick et al. |
| 2010/0322213 A1 | 12/2010 | Liu et al. |
| 2010/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |
| 2011/0069689 A1 | 3/2011 | Grandhi et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0142014 A1 | 6/2011 | Banerjee et al. |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0039176 A1* | 2/2012 | Eshan et al. ............ 370/237 |
| 2012/0087341 A1* | 4/2012 | Jang et al. ............ 370/331 |
| 2012/0099476 A1 | 4/2012 | Mahaffy et al. |
| 2012/0115420 A1 | 5/2012 | Trainin |
| 2012/0195397 A1 | 8/2012 | Sayana et al. |
| 2012/0213162 A1* | 8/2012 | Koo et al. ............ 370/329 |
| 2012/0213208 A1 | 8/2012 | Hsu et al. |
| 2012/0244805 A1 | 9/2012 | Haikonen et al. |
| 2012/0250576 A1 | 10/2012 | Rajamani et al. |
| 2012/0276938 A1 | 11/2012 | Wagholikar et al. |
| 2012/0294396 A1* | 11/2012 | Desai ............ 375/343 |
| 2012/0327779 A1* | 12/2012 | Gell et al. ............ 370/238 |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1* | 5/2013 | Banerjea ............ 370/329 |
| 2013/0130684 A1* | 5/2013 | Gomes et al. ............ 455/435.1 |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0227152 A1 | 8/2013 | Lee et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0087663 A1 | 3/2014 | Burchill et al. |
| 2014/0126552 A1 | 5/2014 | Dayal et al. |
| 2014/0362735 A1 | 12/2014 | Mahaffy et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Foreign Office Action", EP Application No. 13169350.9, May 9, 2014, 3 Pages.

"Non-Final Office Action", U.S. Appl. No. 12/646,721, May 8, 2014, 17 pages.

"Non-Final Office Action", U.S. Appl. No. 12/646,802, May 21, 2014, 19 pages.

"Non-Final Office Action", U.S. Appl. No. 13/458,227, Jul. 3, 2014, 10 pages.

"Non-Final Office Action", U.S. Appl. No. 13/911,979, Jun. 9, 2014, 11 pages.

"Non-Final Office Action", U.S. Appl. No. 14/089,515, May 13, 2014, 9 pages.

"Notice of Allowance", U.S. Appl. No. 13/722,354, May 15, 2014, 4 pages.

"Notice of Allowance", U.S. Appl. No. 13/757,276, Jul. 8, 2014, 6 pages.

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.

Jung, et al.,"A Power Control MAC Protocol for Ad Hoc Networks", In Proceedings of MOBICOM 2002, Sep. 23, 2002, pp. 36-47.

"Advisory Action", U.S. Appl. No. 12/646,721, Aug. 13, 2013, 3 pages.

"Advisory Action", U.S. Appl. No. 12/190,251, Dec. 7, 2011, 3 pages.

Mazzanti, et al.,"Analysis and Design of Injection-Locked LC Dividers for Quadrature Generation", IEEE Journal of Solid-State Circuits, vol. 39, No. 9, Sep. 2004, pp. 1425-1433.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/759,336, Feb. 25, 2013, 11 pages.

"Final Office Action", U.S. Appl. No. 12/358,955, Mar. 18, 2013, 12 pages.

"Final Office Action", U.S. Appl. No. 12/534,361, Feb. 29, 2012, 13 pages.

"Final Office Action", U.S. Appl. No. 12/646,802, Nov. 15, 2012, 15 pages.

(56) References Cited

OTHER PUBLICATIONS

"Final Office Action", U.S. Appl. No. 12/190,251, Sep. 13, 2011, 15 pages.
"Final Office Action", U.S. Appl. No. 12/646,721, Jun. 6, 2013, 16 pages.
"Final Office Action", U.S. Appl. No. 12/484,563, Apr. 24, 2012, 18 pages.
"Final Office Action", U.S. Appl. No. 12/616,454, Apr. 11, 2012, 19 pages.
"Final Office Action", U.S. Appl. No. 12/186,429, Oct. 13, 2011, 23 pages.
"Final Office Action", U.S. Appl. No. 12/542,845, Sep. 25, 2012, 23 pages.
"Final Office Action", U.S. Appl. No. 12/358,955, Feb. 17, 2012, 26 pages.
"Final Office Action", U.S. Appl. No. 12/323,292, Aug. 24, 2012, 26 pages.
"Final Office Action", U.S. Appl. No. 12/487,425, May 3, 2012, 9 pages.
"Foreign Office Action", Chinese Application No. 200980122587.0, Sep. 10, 2013, 11 Pages.
"Foreign Notice of Allowance", Japanese Application No. 2011-513586, Jul. 16, 2013, 2 pages.
"Foreign Office Action", Chinese Application No. 200980122587.0, Feb. 21, 2013, 17 pages.
"Foreign Office Action", European Patent Application No. 09789754.0, Mar. 11, 2013, 4 Pages.
"Foreign Office Action", Japanese Application No. 2011-513586, Apr. 9, 2013, 4 Pages.
"Foreign Office Action", European Patent Application No. 09789754.0, Jul. 12, 2012, 4 pages.
"Foreign Office Action", Japanese Application No. 2011-513586, Oct. 23, 2012, 7 pages.
"Foreign Office Action", EP Application No. 09789754.0, May 17, 2011, 8 pages.
"Further Higher Data Rate Extension in the 2.4 GHz Band", IEEE P802.11g/D8.2,Draft Supplement to Standard [for] Information Technology, Apr. 2003, 69 pages.
Haas, et al.,"Gossip-Based Ad Hoc Routing", IEEE/ACM Transactions on Networking, vol. 14, No. 3, Jun. 2006, pp. 479-491.
"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications,IEEE Standard 802.11h-2003 (Amendment to IEEE Std 802.11-1993), Oct. 14, 2003, 80 pages.
Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
"International Search Report and Written Opinion", PCT Application PCT/US2012/035597, Aug. 6, 2012, 13 pages.
"Non-Final Office Action", U.S. Appl. No. 12/167,841, Jul. 15, 2011, 10 pages.
"Non-Final Office Action", U.S. Appl. No. 12/534,361, Oct. 12, 2011, 11 pages.
"Non-Final Office Action", U.S. Appl. No. 12/190,251, Mar. 29, 2012, 11 pages.
"Non-Final Office Action", U.S. Appl. No. 13/099,169, Mar. 28, 2013, 12 pages.
"Non-Final Office Action", U.S. Appl. No. 13/429,090, Oct. 24, 2013, 13 pages.
"Non-Final Office Action", U.S. Appl. No. 12/484,563, Oct. 4, 2011, 13 pages.
"Non-Final Office Action", U.S. Appl. No. 12/759,336, Oct. 4, 2012, 13 pages.
"Non-Final Office Action", U.S. Appl. No. 12/732,036, Aug. 9, 2012, 13 pages.
"Non-Final Office Action", U.S. Appl. No. 13/479,124, Sep. 27, 2013, 14 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/235,333, Jun. 28, 2011, 16 pages.
"Non-Final Office Action", U.S. Appl. No. 12/646,802, Mar. 29, 2012, 16 pages.
"Non-Final Office Action", U.S. Appl. No. 12/323,292, Dec. 21, 2011, 17 pages.
"Non-Final Office Action", U.S. Appl. No. 12/478,446, Dec. 28, 2011, 17 pages.
"Non-Final Office Action", U.S. Appl. No. 12/883,054, Nov. 22, 2013, 18 pages.
"Non-Final Office Action", U.S. Appl. No. 13/656,482, Mar. 19, 2013, 19 pages.
"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/358,955, Sep. 6, 2011, 24 pages.
"Non-Final Office Action", U.S. Appl. No. 12/542,845, Oct. 23, 2013, 29 pages.
"Non-Final Office Action", U.S. Appl. No. 12/358,955, Aug. 20, 2012, 33 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/487,425, Jan. 6, 2012, 7 pages.
"Non-Final Office Action", U.S. Appl. No. 12/190,240, Jan. 6, 2012, 7 pages.
"Non-Final Office Action", U.S. Appl. No. 12/616,454, Dec. 22, 2011, 8 pages.
"Non-Final Office Action", U.S. Appl. No. 12/190,251, Mar. 29, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 13/656,502, Jun. 25, 2013, 11 pages.
"Notice of Allowance", U.S. Appl. No. 12/167,841, Nov. 25, 2011, 11 pages.
"Notice of Allowance", U.S. Appl. No. 12/534,361, Feb. 14, 2013, 12 pages.
"Notice of Allowance", U.S. Appl. No. 12/190,240, May 16, 2012, 4 pages.
"Notice of Allowance", U.S. Appl. No. 12/616,454, Aug. 22, 2012, 4 pages.
"Notice of Allowance", U.S. Appl. No. 12/235,333, Nov. 15, 2011, 5 pages.
"Notice of Allowance", U.S. Appl. No. 13/604,563, Sep. 26, 2013, 5 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.

(56) References Cited

OTHER PUBLICATIONS

"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 13/656,482, Sep. 3, 2013, 8 pages.
"Notice of Allowance", U.S. Appl. No. 12/759,336, May 3, 2013, 9 pages.
"Notice of Allowance", U.S. Appl. No. 12/186,429, Jun. 6, 2013, 9 pages.
"Notice of Allowance", U.S. Appl. No. 12/487,425, Jul. 26, 2013, 9 pages.
"Part 11: Wireless LAN Medium Access Control (MAC) and Physical Layer (PHY) specifications", IEEE Std 802.11b-1999/Cor 1-2001,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—,IEEE, Apr. 2003, pp. 1-69.
"PCT Search Report", Application No. PCT/US2009/046289, Oct. 29, 2009, 13 pages.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/186,429, Jul. 10, 2013, 2 pages.
"Supplemental Notice of Allowance", U.S. Appl. No. 12/759,336, Aug. 14, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/716,569, Jul. 23, 2012, 2 pages.
"Supplemental Notice of Allowance", U.S. Appl. No. 12/358,955, Oct. 11, 2013, 3 pages.
Mujtaba "TGn Sync Proposal Technical Specification", IEEE 802.11-04/0889r6,This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
"Foreign Office Action", CN Application No. 200980122587.0, Jan. 24, 2014, 10 Pages.
"International Search Report and Written Opinion", Application No. PCT/IB2013/001962, Feb. 6, 2014, 11 Pages.
"Non-Final Office Action", U.S. Appl. No. 13/536,506, Apr. 25, 2014, 12 pages.
"Non-Final Office Action", U.S. Appl. No. 13/722,354, Jan. 17, 2014, 17 pages.
"Non-Final Office Action", U.S. Appl. No. 13/757,276, Jan. 30, 2014, 9 pages.
"Non-Final Office Action", U.S. Appl. No. 13/911,979, Jan. 31, 2014, 19 pages.
"Notice of Allowance", U.S. Appl. No. 13/099,169, Feb. 12, 2014, 11 pages.
"Notice of Allowance", U.S. Appl. No. 13/249,740, Mar. 11, 2014, 6 pages.
"Notice of Allowance", U.S. Appl. No. 13/479,124, Jan. 30, 2014, 7 pages.
"Notice of Allowance", U.S. Appl. No. 13/673,363, Mar. 24, 2014, 4 pages.
"Supplemental Notice of Allowance", U.S. Appl. No. 13/479,124, Apr. 18, 2014, 5 pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k-2008, Jun. 12, 2008, 244 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Introduction to 802.11n Outdoor Wireless Networks", InscapeData White Paper, Mar. 29, 2011, 9 pages.
"Non-Final Office Action", U.S. Appl. No. 13/673,363, Nov. 29, 2013, 12 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.
"Final Office Action", U.S. Appl. No. 12/646,721, Nov. 28, 2014, 19 pages.
"Final Office Action", U.S. Appl. No. 12/646,802, Dec. 17, 2014, 17 pages.
"Foreign Office Action", CN Application No. 200980122587.0, Jul. 3, 2014, 12 Pages.
"Foreign Office Action", CN application No. 200980122587.0, Dec. 3, 2014, 10 Pages.
"Non-Final Office Action", U.S. Appl. No. 12/883,054, Sep. 11, 2014, 29 pages.
"Non-Final Office Action", U.S. Appl. No. 13/735,458, Sep. 24, 2014, 8 pages.
"Non-Final Office Action", U.S. Appl. No. 13/761,949, Jan. 12, 2015, 16 pages.
"Non-Final Office Action", U.S. Appl. No. 14/063,972, Sep. 24, 2014, 6 pages.
"Non-Final Office Action", U.S. Appl. No. 14/082,981, Aug. 4, 2014, 6 pages.
"Non-Final Office Action", U.S. Appl. No. 14/275,615, Oct. 6, 2014, 28 pages.

(56) References Cited

OTHER PUBLICATIONS

"Non-Final Office Action", U.S. Appl. No. 14/466,687, Oct. 3, 2014, 5 pages.
"Notice of Allowance", U.S. Appl. No. 13/536,506, Sep. 19, 2014, 7 pages.
"Notice of Allowance", U.S. Appl. No. 13/735,458, Jan. 12, 2015, 4 pages.
"Notice of Allowance", U.S. Appl. No. 13/911,979, Nov. 20, 2014, 12 pages.
"Notice of Allowance", U.S. Appl. No. 14/063,972, Nov. 7, 2014, 8 pages.
"Notice of Allowance", U.S. Appl. No. 14/089,515, Aug. 21, 2014, 4 pages.
"Supplemental Notice of Allowance", U.S. Appl. No. 13/757,276, Oct. 24, 2014, 2 pages.
"Corrected Notice of Allowance", U.S. Appl. No. 14/063,972, Jan. 26, 2015, 2 pages.
"Corrected Notice of Allowance", U.S. Appl. No. 14/063,972, Feb. 25, 2015, 2 pages.
"Non-Final Office Action", U.S. Appl. No. 14/082,981, Feb. 13, 2015, 13 pages.
"Notice of Allowance", U.S. Appl. No. 12/883,054, Feb. 9, 2015, 12 pages.
"Notice of Allowance", U.S. Appl. No. 13/458,227, Jan. 2, 2015, 7 pages.
"Notice of Allowance", U.S. Appl. No. 14/275,615, Feb. 27, 2015, 7 pages.
Deering,"Version 6 (IPv6) Specification", RFC2460, Dec. 1998, 35 pages.
"Corrected Notice of Allowance", U.S. Appl. No. 13/735,458, Apr. 20, 2015, 2 pages.
"Final Office Action", U.S. Appl. No. 14/466,687, Apr. 30, 2015, 13 pages.
"Non-Final Office Action", U.S. Appl. No. 12/646,802, Apr. 8, 2015, 19 pages.
"Notice of Allowance", U.S. Appl. No. 14/082,981, May 18, 2015, 7 pages.
"Restriction Requirement", U.S. Appl. No. 14/071,171, Apr. 27, 2015, 6 pages.
"Supplemental Notice of Allowance", U.S. Appl. No. 14/275,615, Jun. 5, 2015, 4 pages.

\* cited by examiner

METHOD AND APPARATUS FOR AVOIDING INTERFERENCE AMONG MULTIPLE RADIOS

CROSS-REFERENCE TO RELATED APPLICATION

This present disclosure claims priority to U.S. Provisional Patent Application Ser. No. 61/540,162 filed Sep. 28, 2011, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices often communicate over multiple wireless networks to exchange data or access services. Each of these wireless networks typically operates within one or more respective frequency bands. Computing devices often include multiple radios (e.g., co-existing radios) that support simultaneous communication in the different frequency bands of the respective wireless networks. Although most of these frequency bands do not overlap, some of the frequency bands may be very close or adjacent to one another.

Accordingly, signals from one radio of the computing device may interfere with communications of another radio of the computing device attempting to use an adjacent frequency band. For example, transmissions (or harmonics thereof) of a first radio near an edge of a frequency band may bleed into an adjacent frequency band and be received by a receiver of a second radio. The relative strength of the transmission (e.g., due to proximity of an antenna of the first to an antenna of the second radio) and sensitivity of the receiver may impair an ability of the second radio to receive signals in the second frequency band. This can degrade the performance of the second radio, resulting in reduced signal quality, signal strength, data throughput, or even loss of a communication link.

SUMMARY

This summary is provided to introduce subject matter that is further described below in the Detailed Description and Drawings. Accordingly, this Summary should not be considered to describe essential features nor used to limit the scope of the claimed subject matter.

Generally, this disclosure describes one or more aspects including a method for determining whether a communication channel of a first wireless interface of a device is adjacent to a frequency band in which a second wireless interface of the device is configured to communicate. The communication channel is one of a plurality of communication channels available to the first wireless interface and the first wireless interface is configured to communicate using one of the plurality of communication channels as selected by a base station with which the first wireless interface is associated. The method further includes altering channel measurement results prior to transmission by the first wireless interface to the base station effective to prevent the base station from selecting, for use by the first wireless interface, the communication channel adjacent to the frequency band in which the second wireless interface is configured to communicate.

Another method is described for determining whether a communication channel of a first wireless interface of a device is adjacent to a frequency band in which a second wireless interface of the device is configured to communicate. The communication channel is one of a plurality of communication channels available to the first wireless interface and the first wireless interface is configured to communicate using one of the plurality of communication channels as selected by a base station with which the first wireless interface is associated. The method further includes preventing the first wireless interface from transmitting a channel measurement report to the base station effective to prevent the base station from selecting, for use by the first wireless interface, the communication channel adjacent to the frequency band in which the second wireless interface is configured to communicate.

A system is described that is configured to determine whether any communication channels of a first wireless interface are adjacent to a frequency band in which a second wireless interface is configured to communicate. The first wireless interface is configured to use one of the plurality of communication channels selected by a base station with which the first wireless interface is associated. The system is further configured to alter channel measurement results prior to transmission by the first wireless interface to the base station effective to prevent the base station from selecting, for use by the first wireless interface, those of the plurality of communication channels that are determined to be adjacent to the frequency band in which the second wireless interface is configured to communicate.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for mitigating interference between multiple radios (e.g., co-existing radios) often rely on filtering transmissions or isolating antennas to reduce interference between communications in adjacent frequency bands. Adding hardware filters or increasing antenna isolation, however, increases design cost and complexity. This disclosure describes apparatuses and techniques for avoiding interference among multiple radios. In one aspect, a first radio of a device may avoid using communication channels adjacent to a frequency band in which a second radio of the device is configured to communicate. By so doing, interference between the co-existing radios can be avoided potentially improving signal strength, signal quality, or data throughput associated with either or both co-existing radios.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
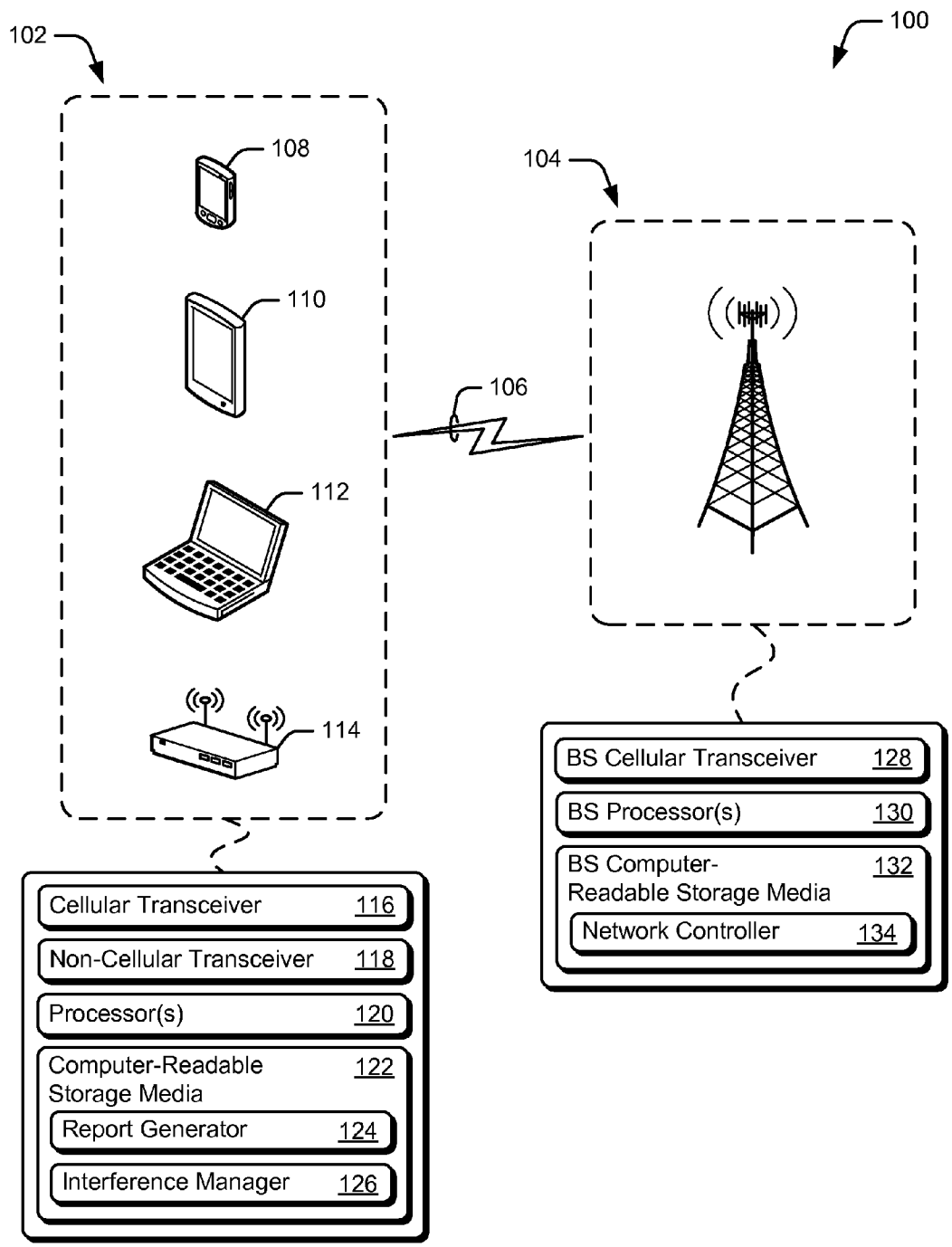
FIG. 1 illustrates an operating environment having wireless devices in accordance with one or more aspects.

FIG. 1 illustrates an example operating environment 100 having user-equipment devices 102 (UE devices 102) and base station device 104 (BS device 104), each of which are capable of communicating data, packets, and/or frames over a wireless link 106, such as a wireless-wide-area network (WWAN). UE devices 102 include smart-phone 108, tablet computer 110, laptop computer 112, and cellular broadband router 114 (broadband router 114). Although not shown, other configurations of UE devices 102 are also contemplated such as a desktop computer, server, wireless-modem card, mobile-internet device (MID), gaming console, mobile hotspot, access point, and so on.

Each UE device 102 includes a cellular transceiver 116 (e.g., cellular radio) and a non-cellular transceiver 118 (e.g., non-cellular radio) that provide wireless interfaces to handle various communication protocols, such as for example 3rd Generation Partnership Project Long-Term Evolution (3GPP LTE), Bluetooth™, or IEEE 802.11-2007, IEEE 802.11n, and the like. Cellular transceiver 116 may operate in a frequency band associated with a particular communication standard or protocol by which cellular transceiver 116 communicates. For example, when cellular transceiver 116 operates in an LTE network, one or more LTE frequency bands may be used for communication, such as LTE band 40 (2.3-2.4 GHz) or LTE band 7 (2.5-2.69 GHz). With respect to cellular networking, UE device 102 may also be referred to as a mobile station (MS). Each communication protocol or standard may define one or more frequency bands in which communication occurs as will be described in greater detail below. Further, each respective frequency band may include multiple communication channels through which signals may be transmitted and/or received. UE device 102 may communicate by transmitting and/or receiving signals through one or more of these multiple communication channels.

Cellular transceiver 116 may be embodied separately as a transmitter and receiver (not shown) or integrated (shown) and may be hardware combined with or separate from firmware or software. Cellular transceiver 116 functions as a wireless interface for communicating data of UE device 102. Cellular transceiver 116 may comprise any suitable type of cellular radio, such as an LTE radio, universal mobile telecommunications system (UMTS) radio, or worldwide interoperability for microwave access (WiMax) radio. Cellular transceiver 116 communicates data and/or control signal with BS device 104 via wireless connection 106. At least some communicative aspects of cellular transceiver 116, such as communication channel selection and handover decisions, are managed by BS device 104.

Non-cellular transceiver 118 may be embodied separately as a transmitter and receiver (not shown) or integrated (shown) and may be hardware combined with or separate from firmware or software. Non-cellular transceiver 118 functions as a wireless interface for communicating data of UE device 102. Alternately or additionally, UE devices 102 may include multiple non-cellular transceivers 118, such as a short-range wireless network transceiver and a wireless-local-area-network (WLAN) transceiver. Non-cellular transceiver 118 may operate in the industrial, science, and medical frequency band (ISM Band), which includes frequencies of 2.4-2.5 GHz. In some cases, non-cellular transceiver 118 may be embodied as a non-cellular receiver, such as a global position system (GPS) receiver. Non-cellular transceiver 118 may communicate with another non-cellular transceiver 118 of a peer UE device 102 or a network managing entity (e.g., access point, wireless router, or Pico-net controller).

UE devices 102 also include processor(s) 120, computer-readable storage media 122 (CRM 122), a channel measurement report generator (report generator 124), and a co-existing radio interference manager (interference manager 126). In one implementation interference manager 126 is embodied on CRM 122. CRM 122 may include any suitable memory or storage device such as random-access memory (RAM), static RAM (SRAM), non-volatile RAM (NVRAM), read-only memory (ROM), or Flash memory useful to store data of applications and/or an operating system of the UE device 102. Report generator 124 provides channel measurement reports that describe measured characteristics for a given communication channel. Interference manager 126 may alter results of channel measurement reports or activities associated with triggering and/or transmitting the channel measurement reports to a base station. How interference manager 126 is implemented and used varies and is described below.

UE devices 102 may be configured as endpoint devices in a cellular network, such as smart-phone 108, tablet computer 110, or laptop computer 112, which are configured to provide data access and/or services to a user by connecting to the cellular network to obtain network or Internet connectivity. Alternately or additionally, UE devices 102 may be configured to implement router-like functionality via a secondary wireless network. For example, broadband router 114 can access the Internet via cellular transceiver 116 and provide Internet connectivity to other devices associated with broadband router 114 via non-cellular transceiver 118 (e.g., a WLAN or short-range wireless network). In this particular example, broadband router 114 concurrently communicates over multiple wireless networks and extends services or functionalities of either network to entities of both networks.

Base station device 104 (BS device 104) manages a cell of a wireless network, such as a cellular network. With respect to cellular networking, BS device 104 may be configured as a base station transceiver (BTS), node base station (node B), or enhanced node B (eNB) of an LTE network. BS device 104 includes BS cellular transceiver 128, which provides a wireless interface to handle various communication protocols, such as those mentioned above and elsewhere herein. Although shown as a single transceiver, BS cellular transceiver 128 may be implemented as a separate transmitter and receiver, and may be hardware combined with or separate from firmware or software. BS device 104 also include BS processor(s) 130, BS computer-readable storage media 132 (member CRM 132), and cellular network controller 134 (network controller 134). In one implementation network controller 134 is embodied on BS CRM 132. BS CRM 132 may include any suitable memory or storage device such as static RAM (SRAM), ROM, or Flash memory useful to store data of applications and/or an operating system of BS device 104.

BS device 104 manages, via network controller 134, a cell of a wireless network, such as an LTE network. This includes managing communications of any UE devices 102 associated with BS device 104. The cell managed by BS device 104 may be one of multiple cells that form a coverage area of the wireless network. Each of the multiple cells is managed by a respective BS device 104, which is responsible for managing UE devices 102 within its cell. When UE device 102 is within range of two or more BS devices 104, the BS device 104 with which the UE device 102 is associated may determine whether to initiate a handover of the UE device 102 to another one of the BS devices 104.

Wireless link 106 may include a downlink portion for data communicated from BS device 104 to UE device 102 and an uplink portion for data communicated from UE device 102 to BS device 104. Wireless link 106 may use any suitable communication channel in accordance with a communication protocol by which cellular transceiver 116 operates. These communication channels may reside within particular frequency bands as designated by a communication protocol or standard. In some cases, the uplink and downlink portions of wireless link 106 use a same communication channel. In other cases, the uplink and the downlink portions of wireless link 106 use different communication channels. In such cases, particular uplink and downlink communication channels may be paired or associated for use in forming a wireless link 106.

BS device 104 may communicate data or control information with UE device 102 using wireless link 106. In some cases, UE device 102 may communicate with multiple BS devices 104 using different respective wireless links 106. In such cases, UE device 102 may associate with a serving BS device 104 from which UE device 102 receives data and controls information. While associated with a serving BS device 104, UE device 102 may communicate with other BS devices 104 within range. Each BS device 104 with which UE device 102 communicates may use different communication channels. For example, UE device 102 may measure signal strength, signal quality, or channel quality of a communication channel of another wireless link 106 formed with another BS device 104. The selection and use of communication channels varies and is described in greater detail below.

Figure 2:
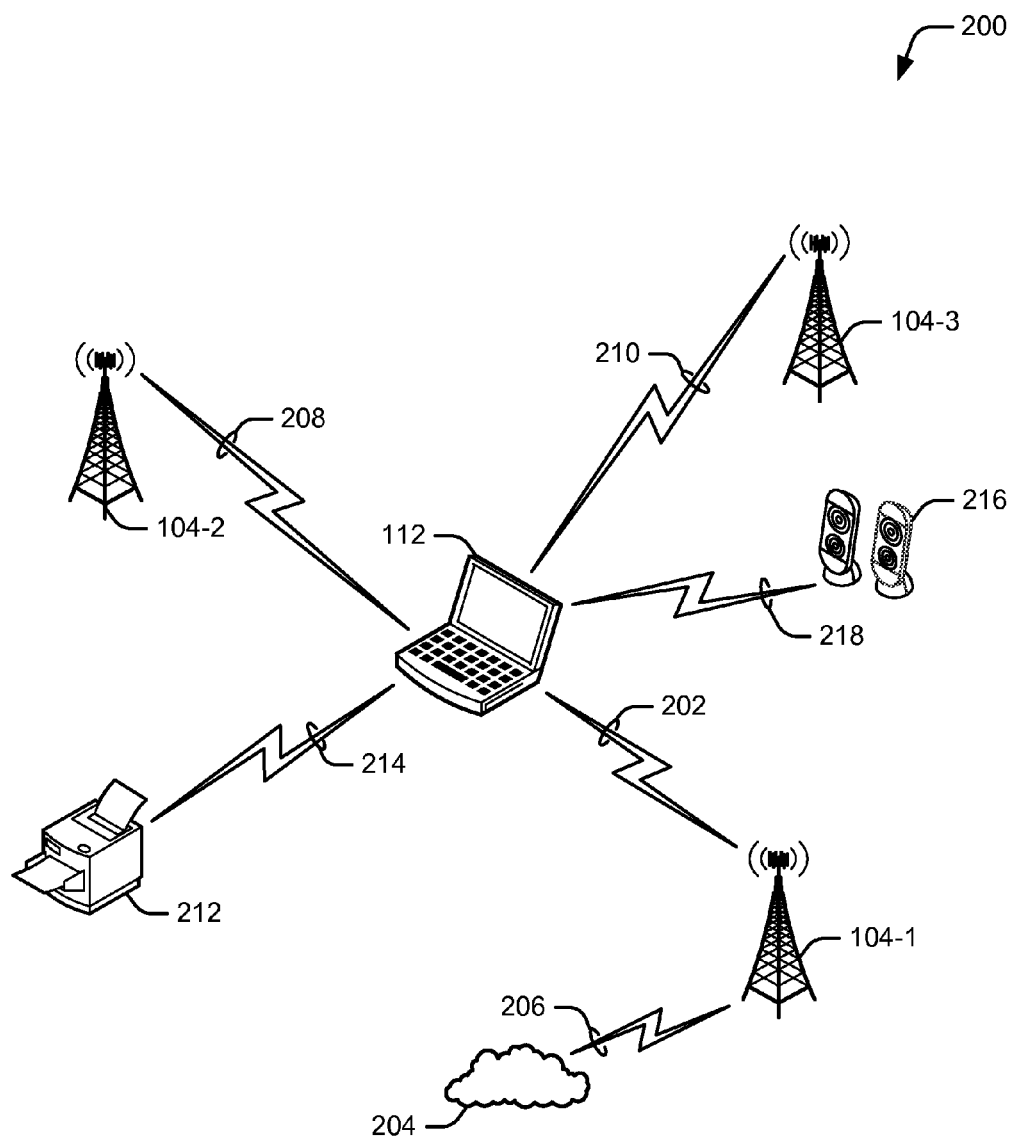
FIG. 2 illustrates an example of devices of FIG. 1 communicating in accordance with one or more aspects.

FIG. 2 illustrates an example of device environment 200 that includes laptop computer 112, which is in range of BS devices 104-1, 104-2, and 104-3. In this particular example, laptop computer 112 is associated with serving BS device 104-1 via wireless link 202. From serving BS device 104-1, laptop computer 112 is able to access data or services of Internet 204 via back haul link 206. Laptop computer 112 may also communicate with BS device 104-2 via wireless link 208 or BS device 104-3 via wireless link 210. Each wireless link 202, 208, and 210 implements a different communication channel for communications with each respective BS device 104-1, 104-2, and 104-3. These communication channels reside within one or more frequency bands in accordance with a particular communication protocol or standard by which cellular transceiver 116 of laptop computer 112 communicates.

Laptop computer 112 may also communicate with wireless printer 212 via wireless link 214 and wireless speakers 216 via wireless link 218. Wireless link 214 may be implemented by a non-cellular transceiver 118, such as a WLAN transceiver. Wireless link 218 may be implemented by another non-cellular transceiver 118, such as a short-range wireless network transceiver. Thus, in the context of device environment 200, laptop computer 112 may communicate concurrently over three different wireless networks. For example, laptop computer 112 can receive data via wireless link 202 of a cellular network, send a print job to wireless printer 212 via wireless link 214 of a WLAN, and transmit audio information to wireless speakers 216 via wireless link 218 of a short-range wireless network.

Communications of one wireless transceiver may interfere with communications of another. In some cases, cellular transceiver 116 may transmit using a communication channel (e.g. an LTE channel) adjacent to (or near) a frequency band (e.g. ISM band) of non-cellular transceiver 118. In such cases, a receiving circuit of non-cellular transceiver 118 may receive these transmissions of cellular transceiver 116 as interference. Alternately or additionally, non-cellular transceiver 118 may transmit using a frequency band (e.g., ISM band) that is adjacent (or near) a communication channel (e.g., an LTE channel) of cellular transceiver 116. A receiving circuit of cellular transceiver 116 may receive these transmissions of non-cellular transceiver 118 as interference. The unintended reception of transmissions from another co-existing radio is an example of co-existing radio interference.

As described above, laptop computer 112 may also communicate with BS device 104-2 via wireless link 208 or BS device 104-3 via wireless link 210. For example, between communications over wireless link 202, laptop computer 112 may communicate via wireless links 208 and 210. Communicating over wireless links 208 and 210 permits cellular transceiver 116 of laptop computer 112 to measure a quality of communication channels associated with wireless links 208 and 210. Report generator 124 can then provide a channel measurement report for the communication channels associated with wireless link 208 and/or wireless link 210.

This measurement report may be transmitted to serving BS device 104-1 for use in a handover process. Serving BS device 104-1 can use this measurement report to determine if a handover of laptop computer 112 to another BS device 104 (e.g., BS device 104-2 or 104-3) would improve communication performance. Thus, serving BS device 104-1 may determine that communications of laptop computer 112 would improve if implemented over a different communication channel and/or another wireless link 106 (e.g., wireless link 208 or 210). For example, a currently selected communication channel of cellular transceiver 116 may be subject to co-existing radio interference due to transmissions of a non-cellular transceiver 118. In such a case, serving BS device 104-1 would initiate a handover process to another BS device 104 that communicates using a different communication channel, such as BS device 104-2 or 104-3. These are but a few example aspects of implementing techniques for avoiding co-existing radio interference, which are described in greater detail below.

Techniques of Avoiding Interference Among Multiple Radios

The following discussion describes techniques of avoiding interference among multiple radios. These techniques can be implemented using the previously described environments or entities, such as interference manager 126 of FIG. 1 embodied on a UE device 102. These techniques include methods illustrated in FIGS. 3, 5, and 7, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 and/or entities of FIG. 2 but rather as illustrative of one of a variety of examples.

Figure 3:
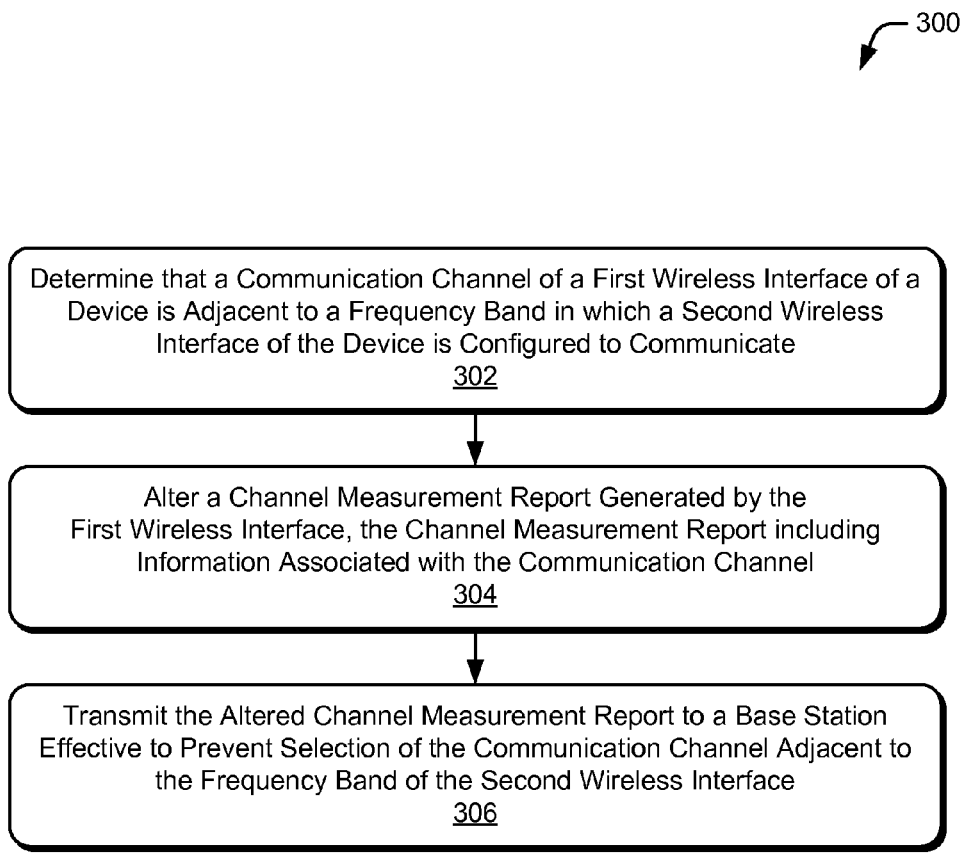
FIG. 3 illustrates a method of altering channel measurement results transmitted to a base station.

FIG. 3 depicts a method 300 for altering channel measurements transmitted to a base station, including operations performed by interference manager 126 of FIG. 1.

At 302, it is determined that a communication channel of a first wireless interface of a device is adjacent to a frequency band in which a second wireless interface of the device is configured to communicate. The first wireless interface may include a cellular transceiver or a wireless-wide-area-network (WWAN) radio. The communication channel may be one of multiple channels available to the first wireless interface for use in communication. Communications of the first wireless interface may be managed by a base station with which the first wireless interface is associated (e.g. serving base station). In some cases, managing communications of the first wireless interface comprises selecting a communication channel or a base station with which the first wireless interface is to communicate. In such cases, selecting another channel for the first wireless interface may include selecting another base station as a serving base station.

The second wireless interface may include a short-range wireless network transceiver or a WLAN transceiver. Communications of the second wireless interface may be scheduled, pending, or ongoing in the frequency band in which the second wireless interface is configured to communicate. These communications may include transmissions and/or reception of data, which can be communicated concurrently with data of the first wireless interface. In some cases, frequency band(s) of the first wireless interface may be adjacent to or overlap frequency band(s) of the second wireless interface. Thus, particular communication channels of the first wireless interface may be adjacent to the frequency band of the second wireless interface.

As an example, consider laptop computer 112 in the context of FIG. 2, which shows laptop computer 112 communicating via wireless link 202 and wireless link 214. Assume here that a user of laptop 112 is accessing Internet 204 via wireless link 202, which is an LTE wireless link. Also assume the user has initiated a print job with wireless printer 212 via wireless link 214, which communicates using a WLAN channel (e.g., channel 1) of the 2.4 GHz band as defined by an IEEE 802.11 standard.

Figure 4:
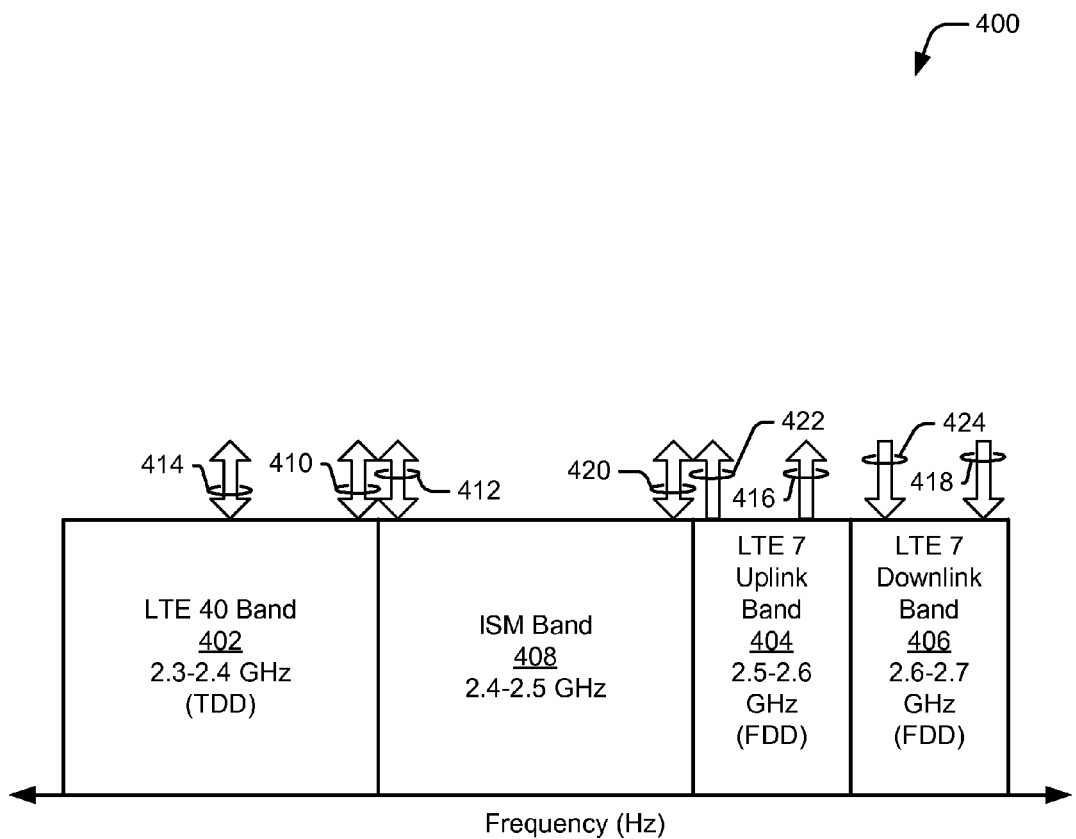
FIG. 4 illustrates an example frequency band allocation of multiple wireless networks.

For visual clarity, various communication channels are shown in FIG. 4, which illustrates an example allocation of frequency bands of multiple wireless networks at 400. These frequency bands include LTE 40 band 402, LTE 7 uplink band 404, LTE 7 downlink band 406, and ISM band 408. As shown by FIG. 4, LTE 40 band 402 and LTE 7 uplink band 404 are adjacent to ISM band 408.

Here, cellular transceiver 116 of laptop computer 112 is configured to communicate using communication channel 410 and non-cellular transceiver 118 is configured to communicate using WLAN channel 412. As illustrated in FIG. 4, transmissions of WLAN channel 412 are adjacent to, and may interfere with, downlink communications of communication channel 410. Accordingly, interference manager 126 determines that communication channel 410 is adjacent to ISM band 408, and more specifically, WLAN channel 412. It is to be noted that interference manager 126 may make this determination based on communications pending, scheduled, or ongoing in an adjacent frequency band. Thus, in the case of pending or scheduled non-cellular communication, interference manager 126 can make this determination prior to the occurrence of co-existing radio interference.

At 304, a channel measurement report (e.g., results of a channel measurement) generated by the first wireless interface is altered. This channel measurement report includes information associated with the communication channel of the first wireless interface that is adjacent to the frequency band of the second wireless interface. In some cases, this channel measurement report may be generated responsive to a request from a serving base station to survey communication channels of other base stations. In other cases, the channel measurement report may be generated periodically or responsive to a triggering event. The request may be part of a handover process being performed by the serving base station.

Altering the channel measurement report may include altering parameters useful to perform the channel measurements or altering results produced by the channel measurements. Altering the parameters useful to perform the channel measurements can include altering a threshold or offset of a measurement triggering event. In some cases, these measurement triggering events are based on communication performance with the serving base station being better or worse than a predefined threshold. In other cases, the measurement triggering events are based on communication performance of another base being better than a predefined threshold or better than an offset relative to the performance of the serving base station.

Any two or more of these measurement triggering events may be logically combined, in order to trigger a channel measurement when communication performance with a serving base station falls below a threshold and communication performance with another base station rises above another threshold. Communication performance may be characterized using any suitable quality, such as signal strength, signal quality, signal-to-noise ratio, channel quality, data rates, data throughput, latency times, and the like. Accordingly, altering a threshold or offset of a measurement triggering event can change measurement reporting behavior of a wireless interface of a device.

Altering results produced by the channel measurements may include altering a reference signal received power (RSRP), reference signal received quality (RSRQ), or channel quality indicator (CQI). These channel measurement results may be altered by degrading the channel measurement results by a predefined factor. For example, an RSRP or RSRQ indicator may be reduced by a particular number of decibels (dB), such as by 3 dB or 5 dB.

In the context of the present example, assume serving BS device 104-1 transmits a channel measurement request via communication channel 410 to laptop computer 112. Cellular transceiver 116 then measures performance characteristics of communication channel 410 of wireless link 202 and communication channel 414 of wireless link 208. Report generator 124 provides, based on the measured performance characteristics, a channel measurement report.

Interference manager 126 then alters, based on the determination of operation 302, results of the channel measurement report that are associated with communication channel 410, which is adjacent to ISM band 408. The altered results of the channel indicate that communication channel 410 is impaired, even though the channel measurement may not indicate such (e.g., non-cellular transceiver 118 is not currently transmitting). It is to be noted and understood that performing a channel measurement is not requisite for generating a channel measurement report. In some aspects, report generator 124 is capable of generating a channel measurement report without measurements of the channel being performed. In these aspects, time and energy involved with actually performing the channel measurements can be conserved.

At 306, the altered channel measurement report is transmitted to the serving base station. This can be effective to prevent the serving base station from selecting, for use by the first wireless interface, the channel adjacent to the frequency band of the second wireless interface. By so doing, the serving base station can be caused to select a communication channel that is not adjacent to the frequency band of the second wireless interface thereby avoiding interference between the co-existing radios.

In some cases, the first wireless interface communicates with the serving base station using the communication channel adjacent to the frequency band of the second wireless interface. In such cases, altering the channel measurement results can be effective to cause the base station to initiate a handover of the first wireless interface to another base station that communicates via another one of the multiple communication channels. In other cases, the first wireless interface communicates with the serving base station using a communication channel that is not adjacent to the frequency band of the second wireless interface. In these cases, altering the measurement results can be effective to prevent the base station from initiating a handover to another base station that communicates via the communication channel adjacent to the frequency band of the second wireless interface.

Concluding the present example, laptop computer 112 transmits the altered channel measurement report to serving BS device 104-1. Here, the altered results associated with communication channel 410 are effective to cause serving BS 104-1 to initiate a handover of cellular transceiver 116 to BS device 104-2, which uses communication channel 414 for communication. By initiating a handover to another BS device 104, interference caused by transmissions of non-cellular interface 118 in ISM band 408 can be avoided when cellular transceiver uses communication channel 414.

Figure 5:
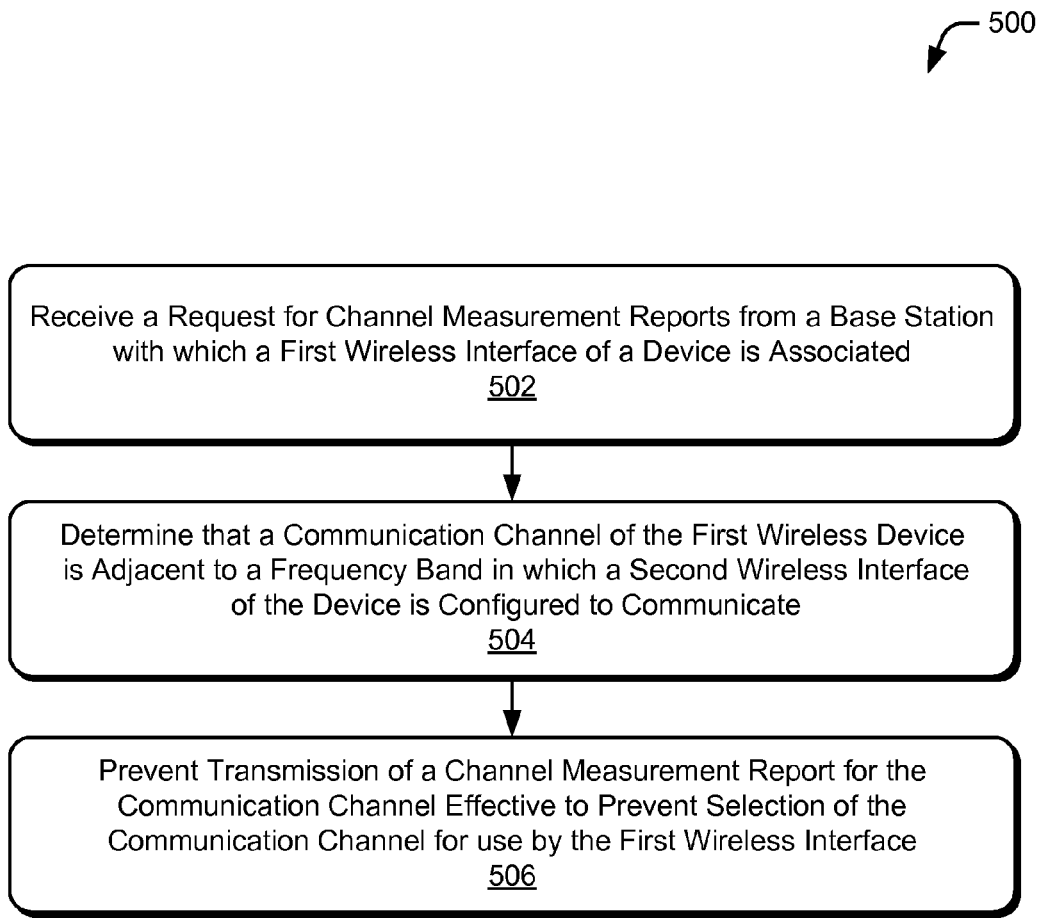
FIG. 5 illustrates a method of preventing a wireless interface from transmitting a channel measurement report to a base station.

FIG. 5 depicts a method 500 of preventing a wireless interface from transmitting a channel measurement report to a base station, including operations performed by interference manager 126 of FIG. 1.

At 502, a request for channel measurement reports is received from a base station. The request for the channel measurement report may be received via a wireless interface which is associated with the base station. This wireless interface may be a first wireless interface of a device that includes at least a second wireless interface, such as a device supporting multiple co-existing radios.

The request may include a carrier frequency and bandwidth information associated with the base station (e.g., serving base station) and/or neighboring base stations. In some cases, physical cell identifiers of the neighboring base stations are provided with the request. Furthermore, neighboring base stations may be identified by demodulating primary or secondary synchronization signals. Reference signals of the neighboring base stations may also be used for identification.

As an example, consider laptop computer 112 again in the context shown in FIG. 2, which shows laptop computer 112 communicating via wireless link 202 and wireless link 218. Assume here that a user of laptop 112 is streaming a movie from Internet 204 via wireless link 202, that is an LTE wireless link. Also assume that audio of the movie is transmitted to wireless speakers via wireless link 218, which is a short-range wireless network link, such as Bluetooth™ or another wireless personal-area-network (WPAN) protocol operating in the ISM band.

In the context of the present example, cellular transceiver 116 receives a request for a channel measurement report from serving BS device 104-1. In this particular example, the request includes a request for channel measurements for wireless link 202 and wireless link 210. In other aspects, however, a request for a channel measurement report may request information associated with any number of wireless links or neighboring base stations.

At 504, it is determined that a communication channel of the first wireless interface is adjacent to a frequency band in which a second wireless interface is configured to communicate. In some cases, the communication channel of the first wireless interface is near to, or overlapping, the frequency band of the second wireless interface. The communication channel may be an uplink, downlink, or bi-directional communication channel. The frequency band of the second wireless interface may be a frequency band used by other wireless interfaces of the device. For example, the device may include a WLAN radio and a WPAN radio, which are both configured to use the ISM band for communication.

The determination may be based on an indication or information received from the first wireless interface and the second wireless interface. In some cases, this information or indication may be responsive to a query performed by a communication arbiter or scheduler (e.g., interference manager 126). The indication may be conveyed as a real time signal or high layer software message between wireless interfaces and/or the communication arbiter or scheduler.

Continuing the ongoing example, interference manager 126 receives channel information from cellular transceiver 116 and non-cellular transceiver 118. For visual clarity, refer again to FIG. 4, which illustrates an example allocation of frequency bands for multiple wireless networks at 400. As described above, these frequency bands include various LTE and ISM frequency bands. These frequency bands include LTE 7 uplink band 404, which is adjacent to ISM band 408.

Here, cellular transceiver 116 of laptop computer 112 is configured to communicate using communication channels 416 (uplink) and 418 (downlink) of wireless link 202, and non-cellular transceiver 118 is configured to communicate using WPAN channel 420 of wireless link 218. Signals of WPAN channel 420 are adjacent to, and may be interfered with by, uplink communications of communication channel 422 of wireless link 210 (not currently selected for use). Nonetheless, interference manager 126 determines that communication channel 422 is adjacent to ISM band 408, and more specifically, WPAN channel 420.

At 506, transmission of a channel measurement report for a communication channel is prevented. This may be effective to prevent a handover of the first wireless interface to another base station that uses the communication channel. In some cases, preventing measurements of the communication channel is effective to prevent the transmission of the channel measurement report. The channel measurement report may be for the communication channel adjacent to the frequency band of the second wireless interface or another communication channel associated with the adjacent channel. For example, LTE uplink channels may be paired with a respective downlink channel. In order to prevent a particular uplink channel from being selected for use, a channel measurement report associated with a paired respective downlink channel may be altered or precluded from being transmitted.

Altering parameters of a measurement triggering event may prevent a channel measurement report from being transmitted. For example, altering a threshold or offset of a measurement triggering event may preclude the generation and/or transmission of a channel measurement report. These measurement triggering events may be based on communication performance of a serving base station being better or worse than a predefined threshold. In other cases, the measurement triggering events are based on communication performance of another base station being better than a predefined threshold or better than an offset relative to the performance of the serving base station.

Concluding the present example, interference manager 126 prevents cellular transceiver 116 of laptop 112 from transmitting a channel measurement report for communication channel 424 (downlink), which is paired with communication channel 422 (uplink). This is effective to prevent serving BS device 104-1 from initiating a handover to BS device 104-3, which uses communication channels 422 and 424 of wireless link 210 for communication. By so doing, cellular transceiver 116 continues to communicate via communication channels 416 and 418 which do not interfere with communications in ISM band 408, thereby avoiding co-existing radio interference.

Figure 6:
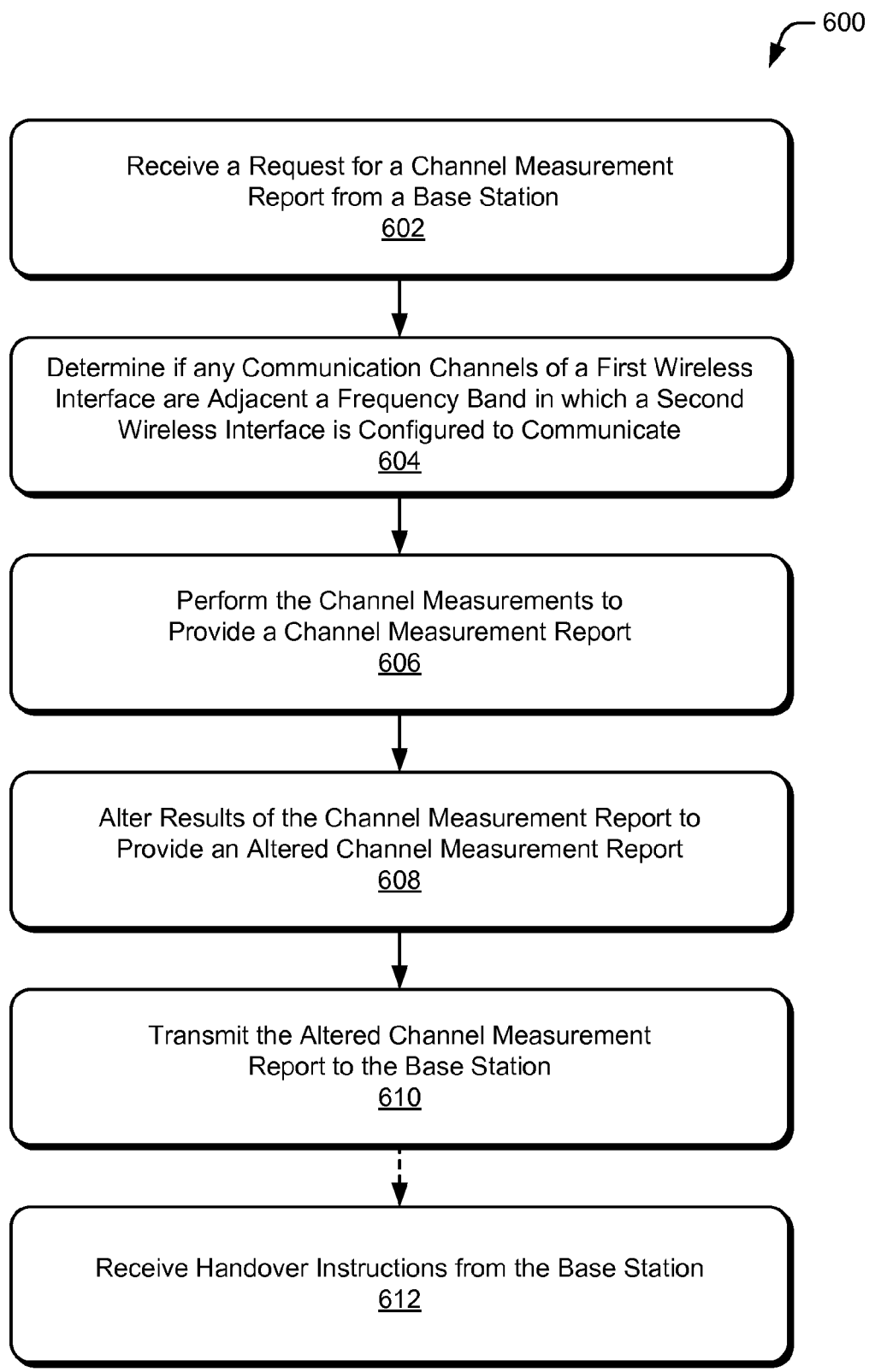
FIG. 6 illustrates a method of responding to a request for a channel measurement report.

FIG. 6 depicts a method 600 of responding to a request for a channel measurement report with an altered channel measurement report, including operations performed by interference manager 126 of FIG. 1.

At 602, a request for a channel measurement report is received from a base station. This request may be received by a first wireless interface of a device that includes at least a second wireless interface, such as a device supporting multiple co-existing radios. The request may include a carrier frequency and bandwidth information associated with the base station (e.g., serving base station) and/or neighboring base stations. In some cases, physical cell identifiers of the neighboring base stations are provided with the request. Furthermore, neighboring base stations may be identified by demodulating primary or secondary synchronization signals. Identification of neighboring base stations may also be determined by their respective reference signals.

At 604, it is determined if any communication channels of the first wireless interface are adjacent to a frequency band in which a second wireless interface of the device is configured to operate. The communication channel may be one of multiple channels available to the first wireless interface for use in communication. Communications of the first wireless interface may be managed by a serving base station with which the first wireless interface is associated. In some cases, managing communications of the first wireless interface comprises selecting a communication channel or a base station with which the first wireless interface is to communicate.

Optionally at 606, channel measurements are performed to provide a channel measurement report. Intra-frequency channel measurements may be performed during communication over a given wireless link with a serving base station. Inter-frequency channel measurements may be performed with other base stations during gaps of communication with the serving base station. Alternately, a channel measurement report may be fabricated without performing channel measurements, saving time and energy involved with actually performing the channel measurements.

At 608, results of the channel measurement report are altered to provide an altered channel measurement report. Specifically, results associated with those communication channels adjacent to the frequency band of the second wireless interface may be altered or degraded. Altering the results of the channel measurement report may include altering a reference signal received power (RSRP), reference signal received quality (RSRQ), or channel quality indicator (CQI). These channel measurement results may be altered by degrading the channel measurement results by a predefined factor. For example, an indication of RSRP or RSRQ may be reduced by a particular number of decibels (dB), such as by 3 dB or 5 dB.

At 610, the altered channel measurement report is transmitted to the base station. This can be effective to prevent the base station from selecting, for use by the first wireless interface, those communication channels adjacent to the frequency band of the second wireless interface. By so doing, the base station can be caused to select a communication channel that is not adjacent to the frequency band of the second wireless interface thereby avoiding interference between the co-existing radios.

Optionally at 612, handover instructions are received from the base station. These instructions may initiate a handover of the first wireless interface to another of the communication channels that is not adjacent to the frequency band of the second wireless interface. By so doing, the first wireless interface may avoid either receiving interference from transmissions of the second wireless interface or interfering with reception of the second wireless interface when transmitting.

System-on-Chip

Figure 7:
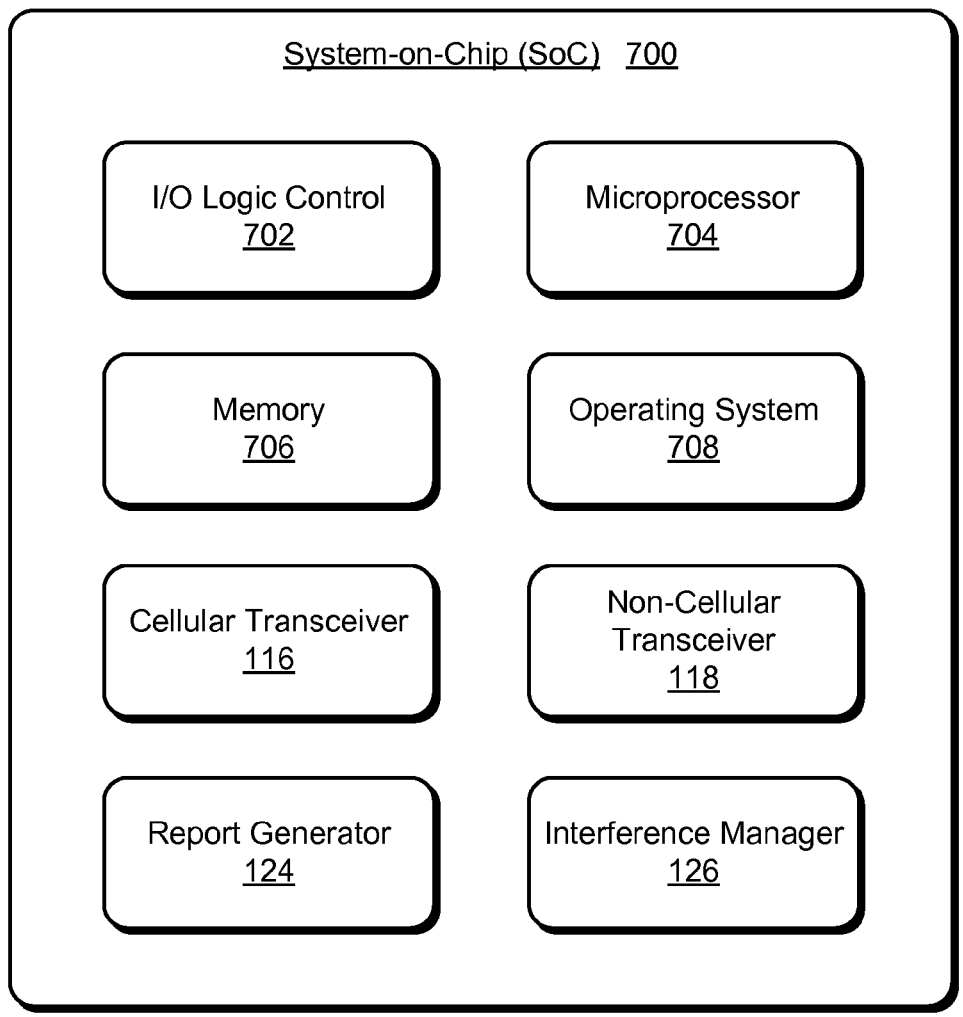
FIG. 7 illustrates a System-on-Chip (SoC) environment for implementing aspects of the techniques described herein.

FIG. 7 illustrates a System-on-Chip (SoC) 700, which can implement various embodiments described above. A SoC can be implemented in any suitable device, such as a video game console, IP enabled television, smart-phone, desktop computer, laptop computer, access point, wireless router, cellular broadband router, tablet computer, server, network-enabled printer, set-top box, printer, scanner, camera, picture frame, and/or any other type of device that may implement wireless connective technology.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection, link, or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type and/or combination of RAM, low-latency nonvolatile memory (e.g., Flash memory), ROM, one-time programmable memory, and/or other suitable electronic data storage. Alternately or additionally, SoC 700 may comprise a memory interface for accessing additional or expandable off-chip memory, such as an external Flash memory module. SoC 700 can also include various firmware and/or software, such as an operating system 708, which can be computer-executable instructions maintained by memory 706 and executed by microprocessor 704. SoC 700 may also include other various communication interfaces and components, communication components, other hardware, firmware, and/or software.

SoC 700 includes cellular transceiver 116, non-cellular transceiver 118, report generator 124, and interference manager 126 (embodied as disparate or combined components as noted above). In other aspects, SoC 700 may include data interfaces to cellular transceiver 116 and/or non-cellular transceiver 118 when either of the transceivers is embodied separately from SoC 700. These data interfaces may communicate data or control signals associated with a respective transceiver, enabling SoC 700 to monitor and/or control activities of the respective transceiver. Thus, even when embodied separately, SoC 700 may implement aspects of techniques described herein using separate transceivers (e.g., acting as communication arbiter). Examples of these various components, functions, and/or entities, and their corresponding functionality, are described with reference to the respective components of the environment 100 shown in FIG. 1 and FIG. 2.

Interference manager 126, either independently or in combination with other entities, can be implemented as computer-executable instructions maintained by memory 706 and executed by microprocessor 704 to implement various embodiments and/or features described herein. Interference manager 126 may also be integrated with other entities of the SoC, such as integrated with one or both of I/O logic controller 702 or any packet-based interface within SoC 700. Alternatively or additionally, interference manager 126 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   determining whether a communication channel of a first wireless interface of a device is adjacent to a frequency band in which a second wireless interface of the device is configured to communicate, wherein the communication channel is one of a plurality of communication channels available to the first wireless interface, and wherein the first wireless interface is configured to communicate using one of the plurality of communication channels as selected by a base station with which the first wireless interface is associated;
   altering, responsive to the act of determining, a channel measurement report generated by the first wireless interface by degrading channel measurement results of the channel measurement report by a predetermined factor; and
   transmitting, via the first wireless interface, the altered channel measurement report to the base station associated with the first wireless interface effective to prevent the base station from selecting, for subsequent use by the first wireless interface, the communication channel adjacent to the frequency band in which the second wireless interface is configured to communicate.

2. The method of claim 1, wherein:
   the base station is a first base station;
   the communication channel of the first wireless interface is a first communication channel of the plurality of communication channels;
   the first wireless interface of the device communicates with the first base station using the first communication channel; and
   transmitting the altered channel measurement report is effective to cause the first base station to initiate a handover of the first wireless interface of the device to a second base station that communicates via a second communication channel of the plurality of communication channels, wherein the second communication channel is different from the first communication channel.

3. The method of claim 1, wherein:
   the base station is a first base station;
   the communication channel of the first wireless interface is a first communication channel of the plurality of communication channels;
   the first wireless interface of the device communicates with the first base station using a second communication channel of the plurality of communication channels; and
   transmitting the altered channel measurement report is effective to prevent the first base station from initiating a handover of the first wireless interface of the device to a second base station that communicates via the first communication channel.

4. The method of claim 1, wherein the communication channel of the first wireless interface of the device is an uplink communication channel and the channel measurement results are for a downlink communication channel with which the uplink communication channel is associated.

5. The method of claim 1, wherein the channel measurement results that are degraded by the predetermined factor include at least one of a reference signal received power (RSRP), reference signal received quality (RSRQ), or channel quality indicator (CQI).

6. The method of claim 1, further comprising receiving a request from the base station to generate the channel measurement report for one or more of the plurality of communication channels.

7. The method of claim 6, further comprising performing channel measurements on one or more of the plurality of communication channels to provide the channel measurement results for the channel measurement report.

8. The method of claim 1, wherein the plurality of communication channels are compliant with a 3rd Generation Partnership Project Long-Term Evolution (3GPP LTE) standard and the frequency band in which the second wireless interface is configured to communicate is the industrial, scientific, and medical (ISM) band.

9. The method of claim 1, wherein the selecting performed by the base station is associated with a handover process.

10. A system comprising:
    a first wireless interface configured to communicate using a communication channel selected from a plurality of communication channels, the communication channel selected by a base station with which the first wireless interface is associated;
    a second wireless interface configured to communicate in a frequency band; and
    an interference manager configured to:
       determine whether the channel selected for communications of the first wireless interface is adjacent to the frequency band in which the second wireless interface of the system is configured to communicate;
       alter, responsive to the act of determining, a channel measurement report generated by the first wireless interface by degrading channel measurement results of the channel measurement report by a predetermined factor; and
       transmit, via the first wireless interface, the altered channel measurement report to the base station associated with the first wireless interface effective to prevent the base station from selecting, for subsequent use by the first wireless interface, the communication channel adjacent to the frequency band in which the second wireless interface is configured to communicate.

11. The system of claim 10, wherein the channel measurement results that are degraded include one of a reference signal received power (RSRP), reference signal received quality (RSRQ), or channel quality indicator (CQI).

12. The system of claim 10, wherein the first wireless interface is a cellular radio and the second wireless interface is a short-range wireless network radio or a wireless-local-area network (WLAN) radio.

13. The system of claim 10, wherein the plurality of communication channels of the first wireless interface are communication channels for uplink and downlink communications.

14. The system of claim 10, wherein the system is embodied as a smart-phone, laptop computer, tablet computer, or cellular broadband router.

15. A non-transitory computer-readable memory device comprising computer-executable instructions that, responsive to execution by one or more processors, implement an interference manager to:
 determine whether a communication channel of a first wireless interface of a device is adjacent to a frequency band in which a second wireless interface of the device is configured to communicate, wherein the communication channel is one of a plurality of communication channels available to the first wireless interface, and wherein the first wireless interface is configured to communicate using one of the plurality of communication channels as selected by a base station with which the first wireless interface is associated;
 alter, responsive to the act of determining, a channel measurement report generated by the first wireless interface by degrading channel measurement results of the channel measurement report by a predetermined factor; and
 transmit, via the first wireless interface, the altered channel measurement report to the base station associated with the first wireless interface effective to prevent the base station from selecting, for subsequent use by the first wireless interface, the communication channel adjacent to the frequency band in which the second wireless interface is configured to communicate.

16. The non-transitory computer-readable memory device of claim 15, wherein the communication channel of the first wireless interface of the device is an uplink communication channel and the channel measurement results are for a downlink communication channel with which the uplink communication channel is associated.

17. The non-transitory computer-readable memory device of claim 15, wherein the interference manager is further configured to perform the channel measurements on one or more of the plurality of communication channels effective to provide the channel measurement results for the channel measurement report.

18. The non-transitory computer-readable memory device of claim 15, wherein the plurality of communication channels are compliant with a 3rd Generation Partnership Project Long-Term Evolution (3GPP LTE) standard and the frequency band in which the second wireless interface is configured to communicate is the industrial, scientific, and medical (ISM) band.

19. The non-transitory computer-readable memory device of claim 15, wherein the channel measurement results that are degraded include one of a reference signal received power (RSRP), reference signal received quality (RSRQ), or channel quality indicator (CQI).

20. The non-transitory computer-readable memory device of claim 19, wherein the channel measurement results that are degraded include the RSRP or RSRQ, and the predetermined factor is approximately three to five decibels (dB).

\* \* \* \* \*